US011300247B1

(12) United States Patent
Miles

(10) Patent No.: US 11,300,247 B1
(45) Date of Patent: Apr. 12, 2022

(54) SIZE-ADJUSTABLE HANGING TIE DOWN DEVICE AND METHOD OF SECURING OBJECTS

(71) Applicant: Kevin J. Miles, Medford, OR (US)

(72) Inventor: Kevin J. Miles, Medford, OR (US)

( * ) Notice: Subject to any disclaimer, the term of this patent is extended or adjusted under 35 U.S.C. 154(b) by 97 days.

(21) Appl. No.: 16/785,271

(22) Filed: Feb. 7, 2020

Related U.S. Application Data

(60) Provisional application No. 62/819,938, filed on Mar. 18, 2019.

(51) Int. Cl.
*F16M 13/00* (2006.01)
*F16M 13/02* (2006.01)

(52) U.S. Cl.
CPC ........ *F16M 13/027* (2013.01); *F16M 13/022* (2013.01)

(58) Field of Classification Search
CPC .............................. F16M 13/027; F16M 13/00
See application file for complete search history.

(56) References Cited

U.S. PATENT DOCUMENTS

| 3,953,911 A | 5/1976 | Fishack |
| 5,317,788 A | 6/1994 | Esposito et al. |
| 6,292,984 B1 | 9/2001 | Nelson |
| 6,345,418 B1* | 2/2002 | Bertrand ................ B65D 63/16 24/16 R |
| 7,343,647 B1* | 3/2008 | Kinskey ..................... A45F 5/00 16/406 |
| 7,418,926 B2* | 9/2008 | Kung ................... A01K 27/005 119/769 |
| D699,405 S * | 2/2014 | McKinnell ............. B65D 63/16 D30/153 |
| 9,402,381 B1* | 8/2016 | Craddock ............ A47B 81/005 |
| 9,528,655 B1 | 12/2016 | Miles |
| 2012/0297582 A1 | 11/2012 | Lee |

* cited by examiner

*Primary Examiner* — Amy J. Sterling
(74) *Attorney, Agent, or Firm* — Jerry Haynes Law

(57) ABSTRACT

A size-adjustable hanging tie down device and method of securing objects creates a synergy within a resilient strap, using a fixed fastener, and a variable-adjustment fastener to form a fixed-size first loop, and a size-adjustable second loop, respectively. The formed first loop securely mounts to a mounting surface, like a hook, to restrict slippage or movement while supporting the weight of object. A first fastener, such as a grommet, fastens a first length of the strap together to form the fixed-size first loop. The second loop is size-adjusted through a female second fastener and a male second fastener, so as to allow for the secure attachment of variably sized and dimensioned objects. The second fasteners may include a buckle, or a hook and loop fastener. Additional attachment mechanisms, such as a carabiner are easily attached to the first loop for increasing length and mounting capacity while hanging the object.

16 Claims, 5 Drawing Sheets

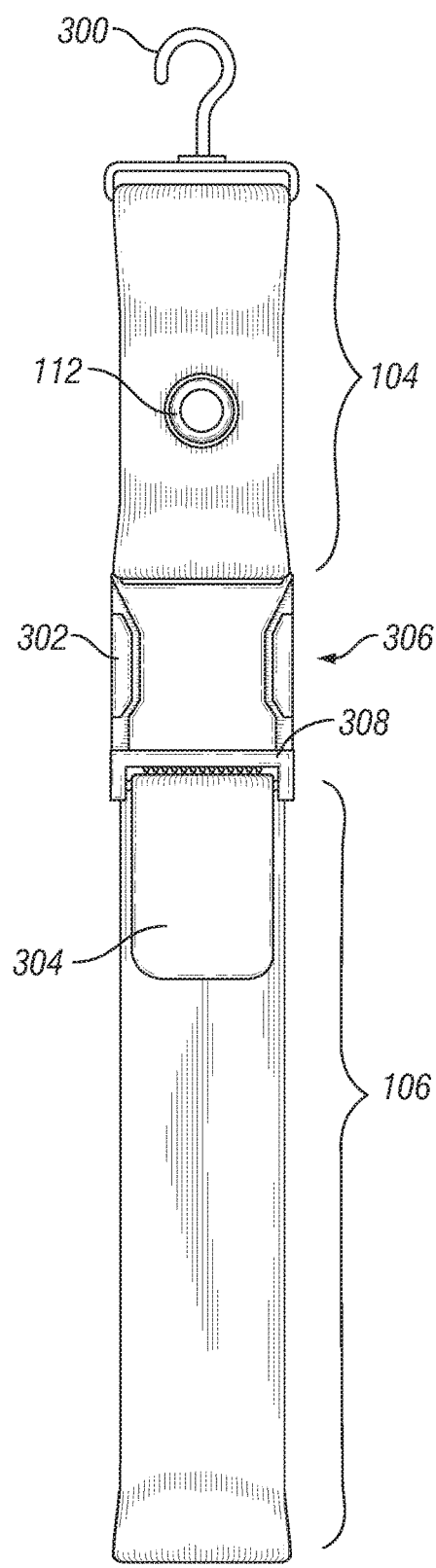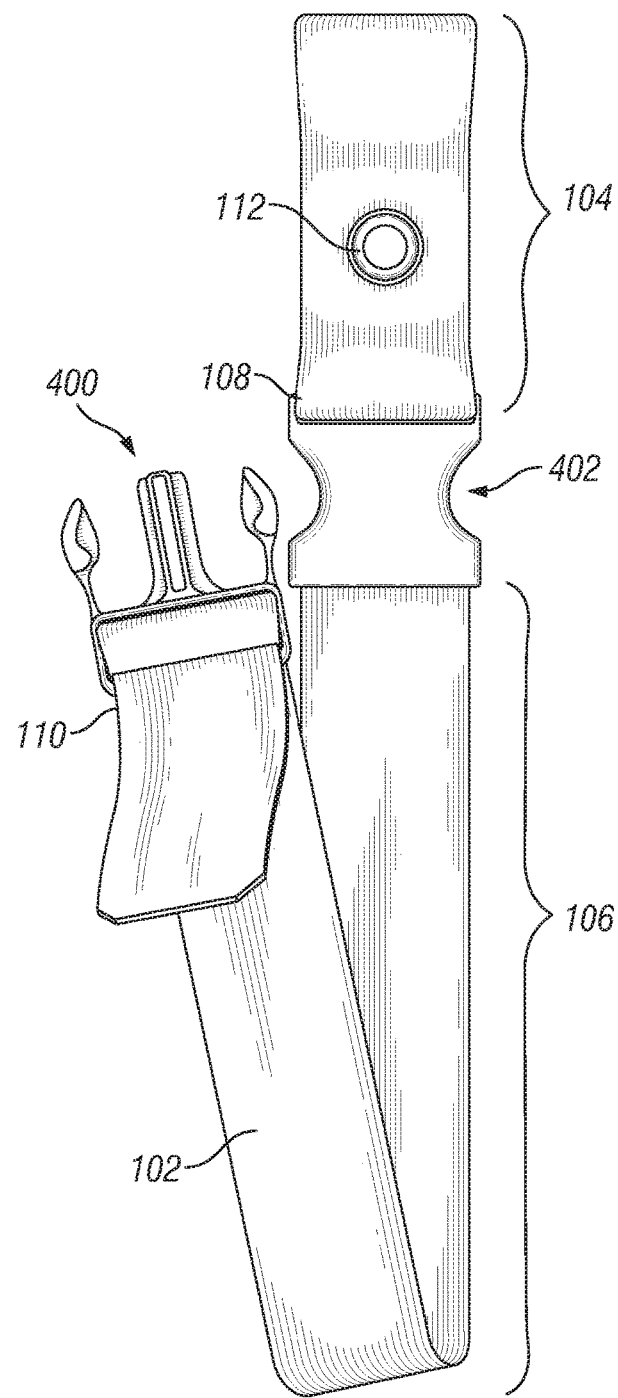
FIG. 3
FIG. 4

SIZE-ADJUSTABLE HANGING TIE DOWN DEVICE AND METHOD OF SECURING OBJECTS

CROSS-REFERENCE TO RELATED APPLICATIONS

This application claims the benefits of U.S. provisional application No. 62/819,938, filed Mar. 18, 2019 and entitled HOOKING AND HANGING TIE DOWN ASSEMBLY AND METHOD OF SECURING OBJECTS, which provisional application is incorporated by reference herein in its entirety.

FIELD OF THE INVENTION

The present invention relates generally to a size-adjustable hanging tie down device and method of securing objects. More so, the present invention relates to a tie-down device that provides a length adjustable strap that forms a fixed first loop for hanging from a mounting surface, and a size-adjustable second loop for wrapping around an object, such that the object can be hung from the mounting surface.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a load is often secured in place by a bungee cord, rope, strap, or other strapping device. Additionally, a cable lock or padlock can be used to lock the item or load and prevent theft. Further, loads held in racks mounted on the tops of vehicles, such as surfboards and the like, are particularly susceptible to theft, requiring a locking tie down device. In many instances, such strap=down devices and systems include ropes, cables, and straps that have a proclivity to become tangled amongst itself and specifically other straps while in storage. It can be problematic to sort through the straps and untangle the cables.

Typically, a tie-down comprises a cable or strap having a fixed section, such as a hook or other fixed attachment mechanism. A second section of the tie-down often includes a length of cable or strap that is permanently attached to the tightening mechanism. The second part of the strap is the length adjusting part that is threaded through the tightening mechanism. Often, this part of the strap usually has a hook or other attachment devise and a loose end which adjusts the overall length of the strap.

Other proposals have involved strap-down devices. The problem with these strap-down devices is that they do not allow for easy mounting to a hook or other mounting surface. Also, they do not provide size adjustability for carrying variously shaped and sized objects. Even though the above cited strap-down devices meets some of the needs of the market, a tie-down device that provides a length adjustable strap that forms a fixed first loop for hanging from a mounting surface, and a size-adjustable second loop for wrapping around an object, such that the object can be hung from the mounting surface, is still desired.

SUMMARY

Illustrative embodiments of the disclosure are generally directed to a size-adjustable hanging tie down device and method of securing objects. The tie down device provides a flat webbed strap that is configured to form two independent loops, which are formed with a fixed fastener to form a fixed-size first loop, and a male and female variable-adjustment fastener to form a size-adjustable second loop.

The first loop securely mounts to a mounting surface, such as a hook, a nail, a pegboard, a pipe, or a ceiling rafter. The second loop supports an object, such as a bicycle, a hose, an extension cord, a hose, a ladder, a toy, and a kayak. The weight of the object is supported by the fixed first loop mounted to the mounting surface. The fixed length of the first loop helps prevent slippage or movement while supporting the weight of an object.

Conversely, the second loop is size-adjusted through a female second fastener and a male second fastener, so as to allow for the secure attachment of variably sized and dimensioned objects. The adjustable configuration of the second loop allows for tension to be varied around the object. The tension helps tie down the object into a secure position, while also inhibiting slippage. The adjustability of the second loop allows the object to be hung from the mounting surface at different lengths. Additional attachment mechanisms, such as a carabiner, are easily attached to increase length and mounting capacity while hanging the object In one aspect, a size-adjustable hanging tie down device, the device comprising:
a strap defined by a first length and a second length, the second length having a female end and a male end;
a first fastener fixedly fastening opposing ends of the first length to form a first loop,
whereby the size and dimension of the first loop is fixed;
a female second fastener disposed at the female end of the second length; and
a male second fastener disposed at the male end of the second length, the male second fastener detachably matable with the female second fastener,
the male and female second fasteners mating to form a second loop from the second length, the female and male second fasteners selectively enabling and restricting axial movement of the second length of the strap,
whereby the size and dimension of the second loop is variable.

In another aspect, the strap comprises a flat webbing.

In another aspect, the strap comprises a length between about 1" to 4".

In another aspect, the first fastener comprises a grommet.

In another aspect, the first loop is operable to enable hanging from a mounting surface.

In another aspect, the device also includes a carabiner that joins with the first loop.

In another aspect, the female second fastener is defined by a slot, the slot being sized and dimensioned to receive the male end of the second length of the strap.

In another aspect, the male end of the second length of the strap advances through the slot to enable adjusting the size and length of the second loop.

In another aspect, the second loop is larger than the first loop.

In another aspect, the second loop is operable to enable supporting an object.

In another aspect, the object includes at least one of the following: a bicycle, a hose, an extension cord, a hose, a ladder, a toy, and a kayak.

In another aspect, the female second fastener comprises a dock.

In another aspect, the male second fastener comprises a prong, the prong being detachably matable with the dock.

In another aspect, the female and male second fasteners comprise a hook and loop fastener.

In another aspect, the female and male second fasteners comprise a web belt buckle.

One objective of the present invention is to securely hang an object to a suspended mounting surface.

Another objective is to provide a fixed fastener, and a variable-adjustment fastener to form a fixed-size first loop, and a size-adjustable second loop, respectively.

Another objective is to provide a strap that has sufficient tensile strength and resiliency to stretch and bend, which helps create tension on the object.

Yet another objective is to length adjust the second loop, so as to accommodate variously sized and dimensioned objects.

Yet another objective is to create a fixed length of the first loop, so as to prevent slippage or movement while supporting the weight of the object.

Yet another objective is to provide an inexpensive to manufacture hooking and hanging tie-down device.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 3 illustrates a top view of an alternative embodiment of the size-adjustable hanging tie down device, showing a female second fastener as an open buckle with teeth, and a male second fastener as a lever, with each fastener mating the male end and female end of the second length of strap, in accordance with an embodiment of the present invention;

FIG. 4 illustrates a top view of an alternative embodiment of the size-adjustable hanging tie down device, showing a female second fastener as a sleeve, and a male second fastener as a prong, with each fastener mating the male end and female end of the second length of strap, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
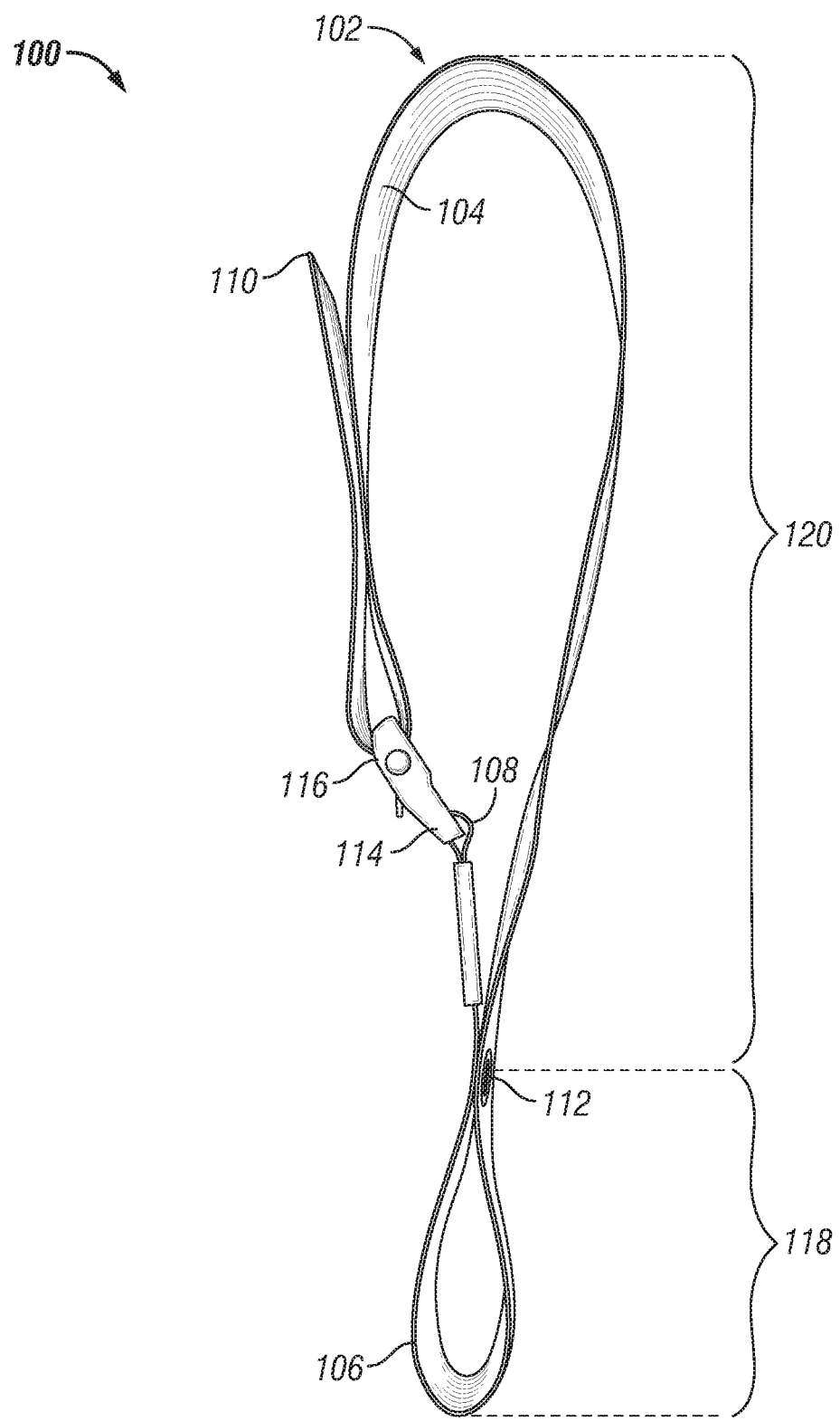
FIG. 1 illustrates a top view of an exemplary size-adjustable hanging tie down device, showing an exemplary male and female second fastener detached, in accordance with an embodiment of the present invention.

A size-adjustable hanging tie down device 100 and method 700 of securing objects is referenced in FIGS. 1-7. As shown in FIG. 1, the size-adjustable hanging tie down device 100, hereafter "device 100" creates a unique synergy within a resilient strap 102 that easily mounts to a fixed structure, while supporting, in a hanging position, eclectically shaped and sized objects. The strap is unique in carrying a fixed first fastener 112 that forms a fixed-size first loop 118; and a length-adjustable pair of female and male second fasteners 114, 116 that form a size-adjustable second loop 120. The capacity to provide both a fixed loop for mounting, and a length adjustable loop for retaining the objects, provides numerous advantages for tying down, and hanging an object 202 from a mounting surface 200.

Figure 2:
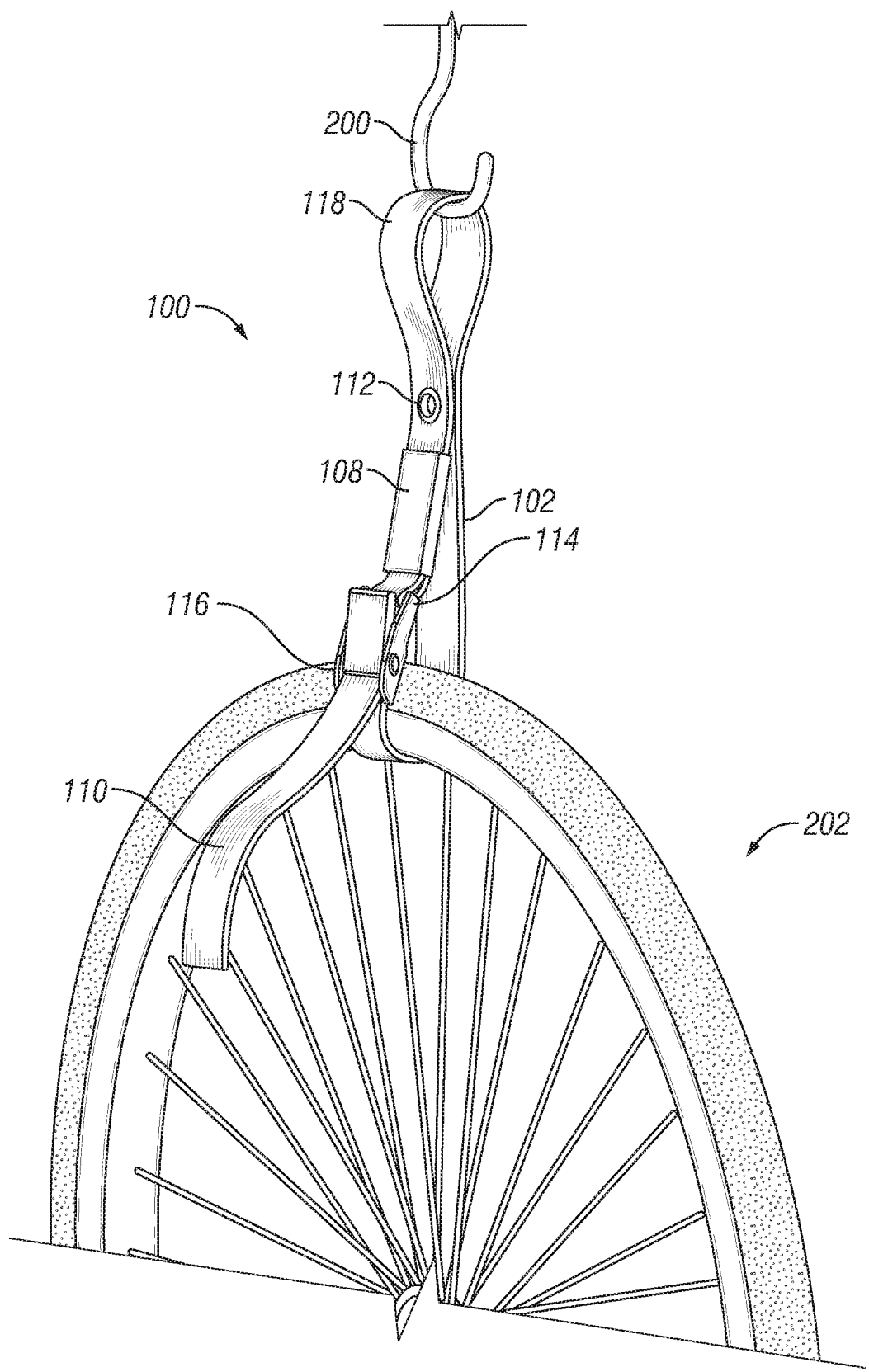
FIG. 2 illustrates a top view of the size-adjustable hanging tie down device shown in FIG. 1, showing a first loop coupled to a mounting surface, and a second loop carrying an object, in accordance with an embodiment of the present invention.
Figure 5:
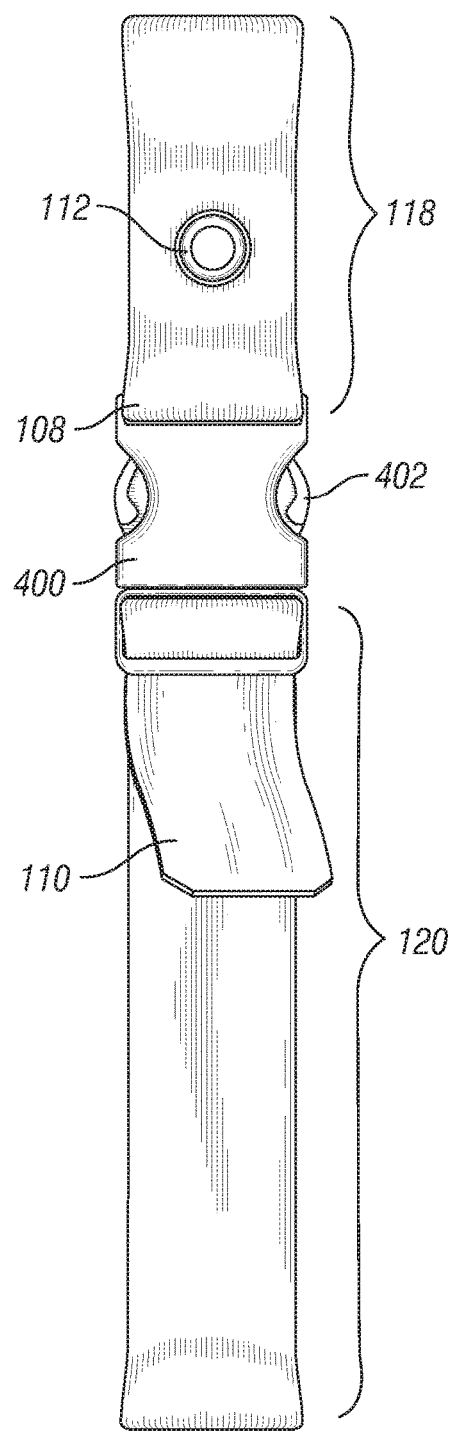
FIG. 5 illustrates a top view of the alternative embodiment of the size-adjustable hanging tie down device, shown in FIG. 4, showing the prong and sleeve fully mated, in accordance with an embodiment of the present invention.

FIG. 2 illustrates the device 100, showing a first loop coupled to a mounting surface 200, and a second loop carrying an object 202. As shown, the first loop 118 that is formed with the first fastener 112 is configured to securely mount, or hang, from a mounting surface 200, such as a hook. In other embodiments, the mounting surface 200 may include, without limitation, a nail, a pegboard, a pipe, and a ceiling rafter. The object 202 that is being suspended from the adjacent second loop 120 (discussed below) may include, without limitation, a bicycle, a hose, an extension cord, a hose, a ladder, a toy, and a kayak. Thus, as illustrated, the second loop 120 carries the object 202, while the weight of the object 202 is supported by the fixed first loop 118 mounted to the mounting surface 200. In this manner, the fixed length of the first loop 118 helps prevent slippage or movement while supporting the weight of an object 202.

Adjacent to the first loop 118, the second loop 120 is size-adjusted through a female second fastener 114 and a male second fastener 116, so as to allow for the secure attachment of variably sized and dimensioned objects. The adjustable configuration of the second loop 120 allows for tension to be varied around the object 202. The tension helps tie down the object 202 into a secure position, while also inhibiting slippage. The adjustability of the second loop 120 allows the object 202 to be hung from the mounting surface 200 at different lengths. Additional attachment mechanisms, such as a carabiner are easily attached to either loop 118, 120, so as increase length and mounting capacity while hanging the object 202.

Looking now at FIG. 3, the device 100 provides a strap 102 that is configured to have sufficient tensile strength and resiliency to stretch, bend, and generally create tension along the length of the strap 102. In one non-limiting embodiment, the strap 102 is a flat webbing that has a length between 1" to 4". Because the present invention is scalable, longer or shorter lengths may also be used. Additional materials for the strap 102 may include rubber, polymers, and resilient materials. The length and width of the strap 102 may be varied to accommodate different mounting surfaces 200 and objects 202.

In one embodiment, the strap 102 has a first length 104 and a second length 106. The first length 104 is generally shorter, forming a small fixed first loop 118 through use of a first fastener 112, such as a grommet. The second length 106 of the strap 102 is adjacent to the first loop, and is defined by a female end 108 and an opposing male end 110. The male end 110 is axially displaced through the female and male second fasteners 114, 116 to form a length/size adjustable second loop 120. Both first and second lengths 104, 106 of strap 102 form independent loops 118, 120, as discussed below.

Looking again at FIG. 1, the device 100 also includes a first fastener 112 that fixedly fastens opposing ends of the first length 104 to form a first loop 118. The size and dimension of the first loop 118 is fixed, which helps to prevent slippage along the first length 104, and the first loop 118. In one non-limiting embodiment, the first fastener 112 comprises a grommet. The first loop 118 is operable to enable hanging from a mounting surface 200. In an additional function, the first fastener 112 may serve to hang from the mounting surface 200 in conjunction with, or independently of the first loop 118. For example, a hook can pass through the first fastener 112 and the first loop 118 to shorten the length of the strap, and to reinforce the connection to the mounting surface.

Figure 6:
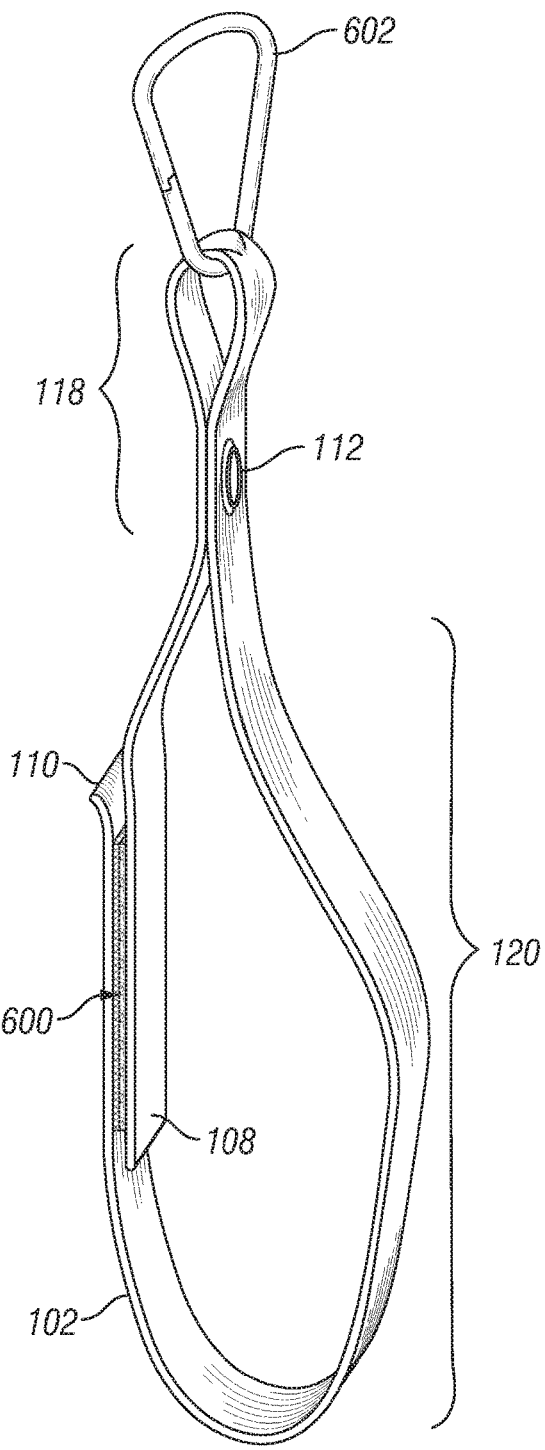
FIG. 6 illustrates a top view of an alternative embodiment of the size-adjustable hanging tie down device, showing female and male second fasteners as hook and loop fasteners, in accordance with an embodiment of the present invention.

Furthermore, as FIG. 6 illustrates, the device 100 may utilize a carabiner 602 that detachably attaches to the first loop 118, adding extra length between the mounting surface 200 and the first loop 118. The carabiner 602 provides yet another means to fasten the strap 102 to the mounting surface 200. The carabiner 602 may have a spring-loaded lever that provides a quick-release mechanism for detachable attachment to the mounting surface 200. This helps facilitate demounting from the mounting surface 200, because minimal force is required to operate the spring-loaded lever contained thereon.

In alternative embodiments, as FIG. 3 illustrates, a hook 300 may be utilized in place of the carabiner 602. The hook 300 detachably attaches to the first loop 118 for hanging to the mounting surface 200, extending the length of the strap 102, and creating an easy-to-dismount version of device 100. The hook exemplifies a simple machine with no moving parts, which can be used to enhance the overall effectiveness of the device 100. In other embodiments, other types of hanging fixtures known in the art may also be used in place of the carabiner 602 or hook 300.

As discussed above, the device 100 allows for adjustable settings for the second length 106 of the strap 102 that forms the second loop 120. The second loop 120 formed by the female and male second fasteners 114, 116 serves to size-adjustably retain an object 202. Thus, a female second fastener 114 and a male second fastener 116 work together in various formats to create detachable mating, and length adjustability for the second length 106 of the strap 102. In one embodiment the female second fastener 114 is disposed at the female end 108 of the second length 106, and the male second fastener 116 is disposed at the male end 110 of the second length 106 of strap. The female second fastener 114 detachably mates with an opposing male second fastener 116 along the second length 106 of the strap 102.

As discussed above, the device 100 provides a male second fastener 116 disposed at the male end 110 of the second length 106. The male second fastener 116 detachably mates with the female second fastener 114. When mated, the second fasteners form a second loop 120 from the second length 106. The female and male second fasteners 114, 116 selectively enable and restrict axial movement of the second length 106 of the strap 102. In this manner the size and dimension of the second loop 120 is variable.

One possible embodiment of the second fasteners 114, 116 is illustrated in FIG. 3. In this configuration, a lock buckle fastener subassembly 306 is used to selectively fasten and release a second loop through use of a pivotably hinged lever 304 and a corresponding pair of spring-biased tabs 302 that lock and release the lever 304. The spring-biased tabs 302 join with the female end 108 of the second length of strap. The lever 304 joins with the male end 110 of the second length of strap. The lever 304 pivotably articulates in relation to the spring-biased tabs 302. The lever 304 is sized to snap-fit between the spring-biased tabs 302 into a locked position. The spring-biased tabs 302 may be pressed inwardly to release the lever 304. Once the lever is released, the second length 106 of strap is free to be axially displaced through a buckle 308 to a desired length. This free movement of second length of strap allows the second loop 120 to be adjusted to a desired size. Once the desired loop size is achieved, the lever 304 pivotably articulates into the locked relationship with the spring-biased tabs 302.

Other embodiments of the second fasteners 114, 116, shown in FIG. 4, include the female second fastener being a sleeve 402 connected to the female end 108 of the second length of strap. An opposing male second fastener is a prong 400 connected to the male end 110 of the second length of strap. The prong 400 is configured to detachably mate with the sleeve 402 in a simple, snap-fit relationship (See FIG. 5). This mating interaction involves the male second fastener prong 400 flexing inwardly while passing through the sleeve 402. As the prong reaches an opening in the sleeve, the prong is tensioned to bias outwardly, creating a clicking sound that indicates completion of mating. This connection secures the second length of strap into the desired length for retaining the object in the second loop. To release the object, the prong 400 and sleeve 402 are easily detached by pressing in on the prongs and pulling the prong 400 from the sleeve 402. This allows for a single operator to load and unload the object 202 from the second loop with minimal skill level or tools.

In yet other embodiments, the female second fastener 114 may have a slot that is sized and dimensioned to receive the female end 108 of the second length 106 of the strap 102. The male end of the second length 106 of the strap 102 advances through the slot to enable adjusting the size and length of the second loop 120. This slotted configuration may include an open buckle with hinged teeth, or a ratchet buckle. This simple mechanical connection allows the male and female buckles to easily attach and detach in a quick-connect/quick-release manner.

In yet another embodiment, shown in FIG. 6, the female and male second fasteners 114, 116 comprise a hook and loop fastener 600 that allows for one-handed operation of the second fasteners. In yet another embodiment, the female and male second fasteners 114, 116 comprises a web belt buckle. Any matable fastening mechanism known in the art of easy release, low skill fasteners may be used however. Other embodiments of buckles and fastening mechanisms for the female and male second fasteners may include simple mechanical buckles/fasteners known in the art.

The second loop 120 formed by the second fasteners 114, 116 serves to size-adjustably retain an object 202. In some embodiments, the object 202 may include, without limitation, a bicycle, a hose, an extension cord, a hose, a ladder, a toy, and a kayak. In some embodiments, the second loop 120 is larger than the first loop 118. The second loop 120 may, however, be size-adjusted to be smaller than the first loop 118, depending on the size and shape of the object 202 and the mounting surface 200.

Thus, the second loop 120 is size-adjustable by mating the female and male second fasteners, and then cinching the second length to a desired length. In this manner, the second loop 120 can be used to wrap around any sized or shaped object 202, while simultaneously hanging the object from a mounting surface through use of the first loop. For example, a bicycle tire receives the second loop 120, while the first loop 118 hangs from a wall peg in a garage. Or, the first fastener 112 hangs from a hook in the wall, while the second loop 120 snugly wraps around a set of tools. In alternative embodiments, the first loop 118 is used to wrap around the object 202, and the second loop 120 hangs from the mounting surface 200.

Figure 7:
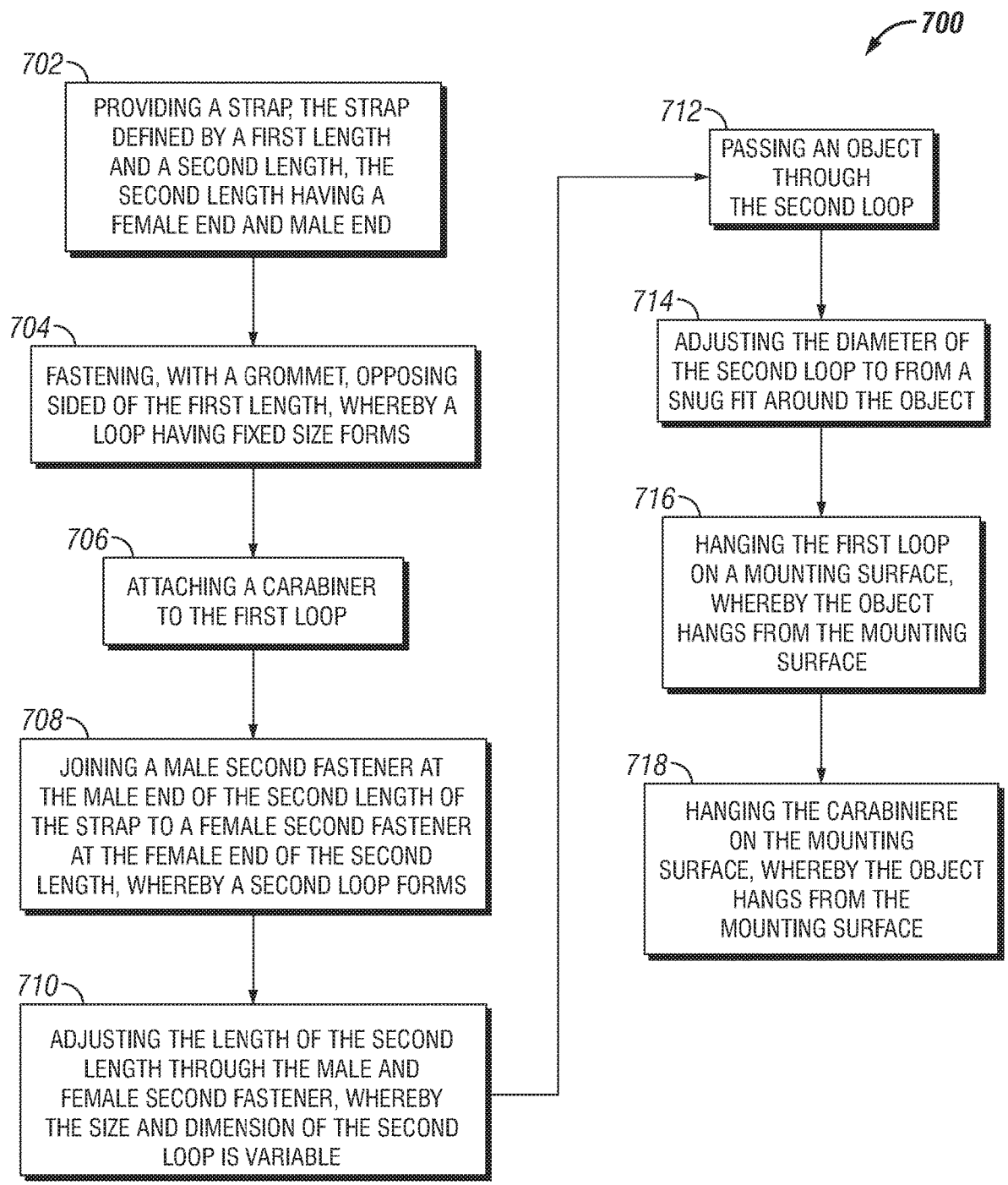
FIG. 7 illustrates a flowchart of an exemplary method for of securing objects with a size-adjustable hanging tie down device, in accordance with an embodiment of the present invention.

FIG. 7 illustrates a flowchart of an exemplary method 700 for hanging an object with a size-adjustable hanging tie-down device. The method 700 may include an initial Step 702 of providing a strap, the strap being defined by a first length and a second length, the second length having a female end and a male end. The strap is resilient, and can be formed into a first loop and an adjacent second loop. The method 700 may further comprise a Step 704 of fastening, with a grommet, opposing sides of the first length, whereby a first loop having fixed size and dimension forms. The first fastener (grommet) is fixed and non-adjustable. In some embodiments, a Step 706 includes attaching a carabiner to the first loop. The carabiner lengthens the strap and is easy to couple/decouple with the mounting surface 200.

In some embodiments, a Step 708 comprises joining a male second fastener at the male end of the second length of the strap to a female second fastener at the female end of the second length, whereby a second loop forms. This forms a second loop 120 that size-adjustably retains an object 202. A Step 710 includes adjusting the length of the second length through the male and female second fasteners, whereby the size and dimension of the second loop is variable. In some embodiments, a Step 712 may include passing an object 202 through the second loop 120.

A Step 714 comprises adjusting the diameter of the second loop to form a snug fit around the object. The second length of strap can be passed through the female second fastener, cinching to a desired length, before locking in the length with the male second fastener. The method 700 may further comprise a Step 716 of hanging the first loop on a mounting surface, whereby the object hangs from the mounting surface. A final Step 718 includes hanging the carabiner on the mounting surface 200, whereby the object hangs from the mounting surface 200. Both the first fastener and the carabiner 602 increase the hanging capacity of the strap by increasing length, allowing for reinforcement, and facilitating decoupling from the mounting surface 200 and the object 202.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A size-adjustable hanging tie down device, the device comprising:
    a strap defined by a first length and a second length extending from and continuous with the first length, the first length terminating in a female end at a first terminus of the strap and the second length terminating in a male end at a second terminus of the strap;
    a first fastener fixedly fastening the first length to form a first loop,
    the first loop closed at one end by the first fastener and having a second continuous looped end opposite the first fastener,
    whereby the size and dimension of the first loop is fixed;
    a female second fastener disposed at the female end of the first length; and
    a male second fastener disposed at the male end of the second length, the male second fastener detachably matable with the female second fastener,
    the male and female second fasteners mating to form a second loop from the second length, the second loop fixedly closed by the first fastener and releasably closed by the male and female second fasteners, the female and male second fasteners selectively enabling and restricting axial movement of the second length of the strap,
    the second loop closed at one end by the first fastener and having a second continuous looped end opposite the first fastener, whereby the one end of the first loop corresponds to the one end of the second loop at the first fastener;
    whereby the size and dimension of the second loop is variable.

2. The device of claim 1, wherein the strap comprises a flat webbing.

3. The device of claim 1, wherein the strap comprises a length between about 1 inch to 4 inches.

4. The device of claim 1, wherein the first fastener comprises a grommet.

5. The device of claim 1, wherein the first loop is operable to enable hanging from a mounting surface.

6. The device of claim 1, further comprising a carabiner, the carabiner joining with the first loop.

7. The device of claim 1, wherein the female second fastener is defined by a slot, the slot being sized and dimensioned to receive the male end of the second length of the strap.

8. The device of claim 7, wherein the male end of the second length of the strap advances through the slot to enable adjusting the size and length of the second loop.

9. The device of claim 1, wherein the second loop is larger than the first loop.

10. The device of claim 1, wherein the second loop is operable to enable supporting an object.

11. The device of claim 10, wherein the object includes at least one of the following: a bicycle, a hose, an extension cord, a hose, a ladder, a toy, and a kayak.

12. The device of claim 1, wherein the female second fastener comprises a dock.

13. The device of claim 12, wherein the male second fastener comprises a prong, the prong being detachably matable with the dock.

14. The device of claim 1, wherein the female and male second fasteners comprise a hook and loop fastener.

15. The device of claim 1, wherein the female and male second fasteners comprises a web belt buckle.

16. The device of claim 1, wherein the female and male second fasteners comprises a pivotably hinged lever and a corresponding pair of spring-biased tabs that lock and release the lever.

\* \* \* \* \*